United States Patent
Rolland et al.

(10) Patent No.: US 11,624,912 B2
(45) Date of Patent: Apr. 11, 2023

(54) AUGMENTED REALITY DISPLAY

(71) Applicant: University of Rochester, Rochester, NY (US)

(72) Inventors: Jannick P. Rolland, Seneca Falls, NY (US); Aaron Bauer, Penfield, NY (US); Nick Vamivakas, Brighton, NY (US); Fei Cheng, Rochester, NY (US); Daniel Nikolov, Rochester, NY (US)

(73) Assignee: University of Rochester, Rochester, NY (US)

( * ) Notice: Subject to any disclaimer, the term of this patent is extended or adjusted under 35 U.S.C. 154(b) by 565 days.

(21) Appl. No.: 16/430,068

(22) Filed: Jun. 3, 2019

(65) Prior Publication Data
US 2019/0369401 A1 Dec. 5, 2019

Related U.S. Application Data

(60) Provisional application No. 62/679,505, filed on Jun. 1, 2018.

(51) Int. Cl.
*G02B 27/01* (2006.01)

(52) U.S. Cl.
CPC ..... *G02B 27/0172* (2013.01); *G02B 27/0176* (2013.01); *G02B 2027/011* (2013.01); *G02B 2027/015* (2013.01); *G02B 2027/0178* (2013.01)

(58) Field of Classification Search
CPC ............ G02B 27/0101; G02B 27/0172; G02B 2027/0145; G02B 27/0176;
(Continued)

(56) References Cited

U.S. PATENT DOCUMENTS

| 9,946,075 B1* | 4/2018 | Hu | G02B 6/0008 |
| 2012/0212499 A1* | 8/2012 | Haddick | G06F 3/017 |
| | | | 345/589 |

(Continued)

FOREIGN PATENT DOCUMENTS

WO WO-2016161175 A1 * 10/2016 ......... G02B 27/0172

*Primary Examiner* — Thomas K Pham
*Assistant Examiner* — Henry A Duong
(74) *Attorney, Agent, or Firm* — Andrew J. Anderson, Esq.; Harter Secrest & Emery LLP

(57) ABSTRACT

A near eye display assembly includes (a) frame; (b) a combiner operably connected to the frame as a first reflective surface positionable in front of an eye of a user of the display assembly; (c) a secondary mirror operably connected to the frame as a second reflective surface positionable proximate a side of the nose adjacent to the eye of a user of the display assembly; (d) an image source operably connected to the frame and optically coupled to the secondary mirror along an optical path; and (e) an optical fold element between the image source and the secondary mirror in the optical path, and positionable proximate the temple adjacent to the eye of a user of the display assembly; wherein an intermediate image is formed in the optical path between the image source and the secondary mirror, wherein the combiner and the secondary mirror are in an off-axis folded geometry which directs images from the optical fold element to an eyebox of the near eye display assembly, and at least one of the combiner and the secondary mirror include a freeform surface, wherein the freeform component corrects optical aberrations induced by a tilting and decentering of the first reflective surface and the second reflective surface, and wherein at least the combiner includes a nanostructured meta-surface which further provides wavefront control of an image from the image source to be directed to the eyebox and enables the combiner to be positioned at a tilt angle so that unobscured images are conveyable between the optical
(Continued)

fold element and the secondary mirror while providing an FOV of at least 30 degrees and an eyebox width of at least 5 mm.

26 Claims, 5 Drawing Sheets

(58) Field of Classification Search
CPC ........ G02B 2027/015; G02B 2027/011; G02B 2027/0178; G02B 2027/0125
USPC ........................................................ 359/633
See application file for complete search history.

(56) References Cited

U.S. PATENT DOCUMENTS

| | | | | |
|---|---|---|---|---|
| 2015/0293382 | A1* | 10/2015 | Jethmalani | G02C 13/003 |
| | | | | 351/204 |
| 2018/0129112 | A1* | 5/2018 | Osterhout | G02B 27/017 |
| 2018/0143427 | A1* | 5/2018 | Griffin | G02B 27/0037 |

* cited by examiner

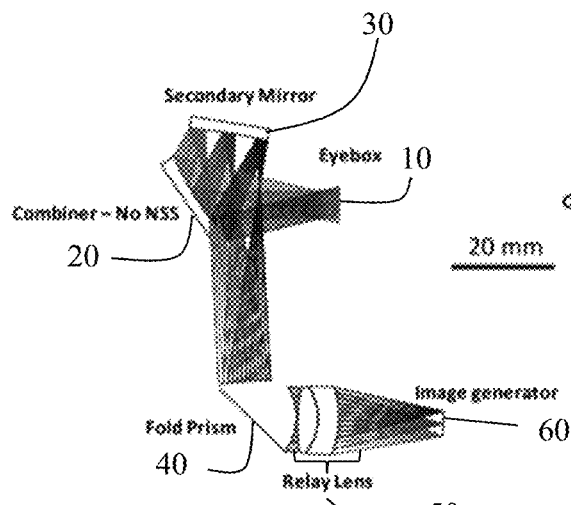
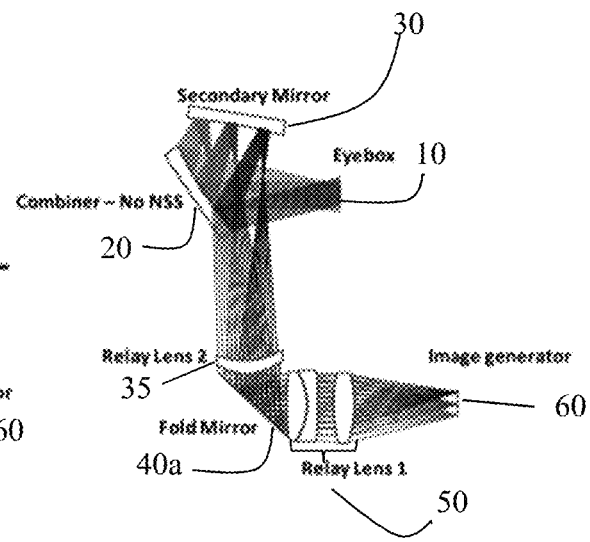
FIG. 1A
FIG. 1B
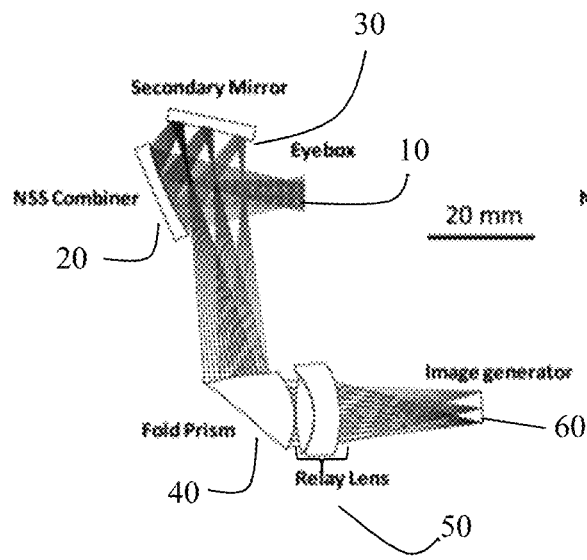
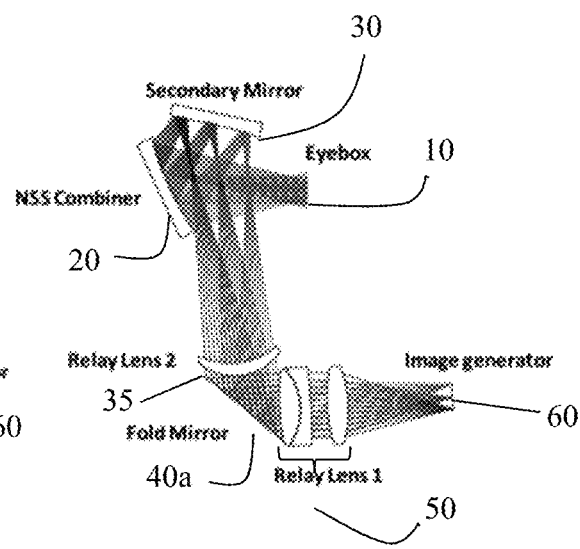
FIG. 2A
FIG. 2B

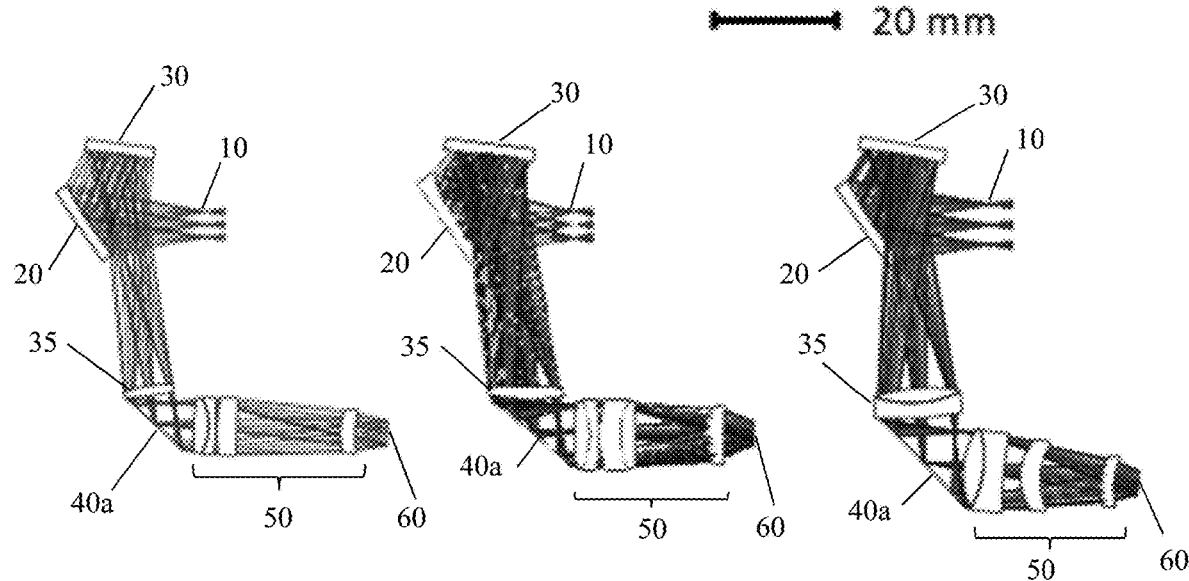
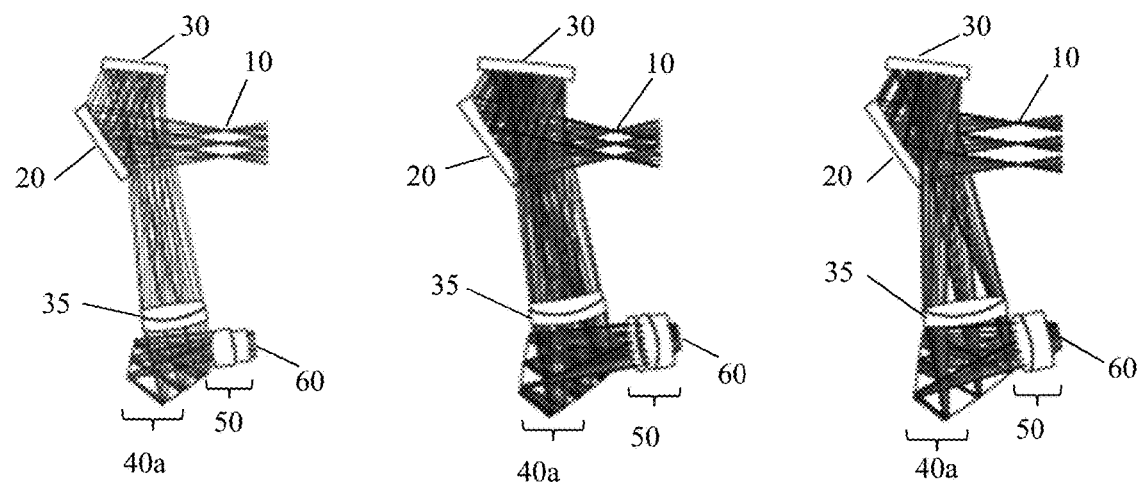
FIG. 3A  FIG. 3B  FIG. 3C
FIG. 3D  FIG. 3E  FIG. 3F

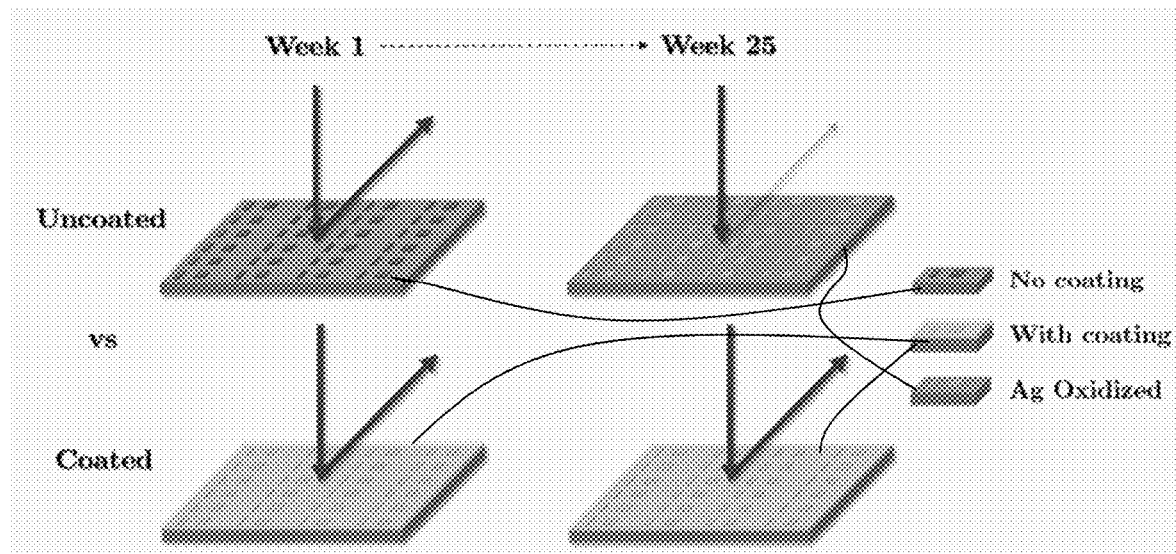
FIG. 5.
FIG. 6A
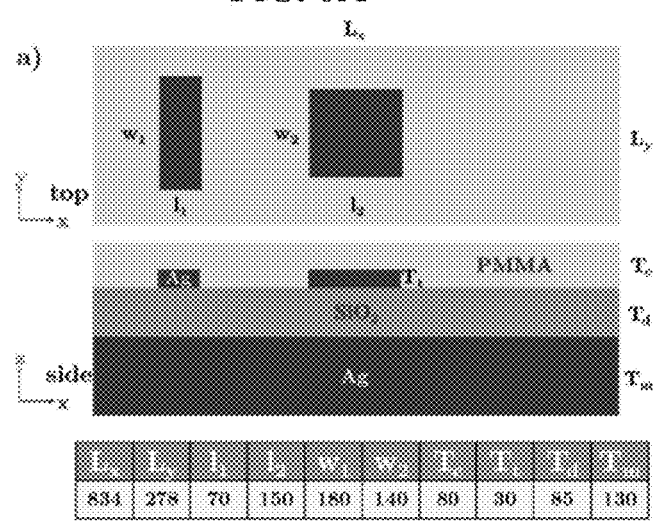
FIG. 6B
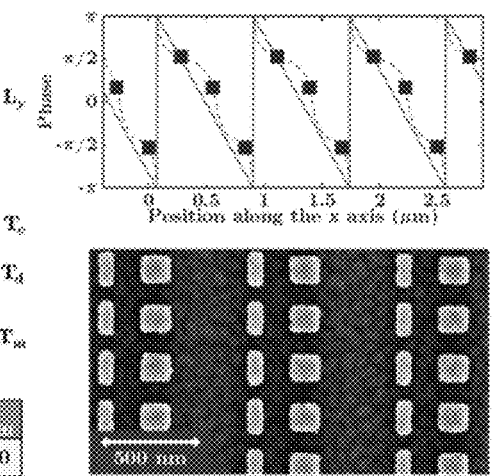
FIG. 6C

AUGMENTED REALITY DISPLAY

CROSS REFERENCE TO RELATED APPLICATIONS

This application claims benefit of provisional U.S. Application No. 62/679,505, filed Jun. 1, 2019, the disclosure of which is incorporated herein in its entirety.

BACKGROUND

A near-eye display is a wearable device that creates a display in front of a field of vision of a user. The display can be transparent or opaque. For example, a transparent display can overlay information and graphics on top of a view of the real world, and thereby "augment" their view of the real world, while an opaque display presents the viewer with only the information from the near eye display.

A near-eye display presents image information to a viewer within viewing pupils (also referred to as "eyeboxes"), which when aligned with the pupils of the eyes of the viewer, produce virtual images within the field of view of the viewer. Combiners of near-eye displays convey image information toward the eyes of the viewers from positions outside the field of view of the viewer. The image information conveyed by the combiner can have an angularly encoded form for projecting virtual images into the eyes of the viewer.

The combiner is an optical apparatus that combines two images together, from either the same side of the combiner (reflective/reflective, or transmissive/transmissive) or from the two different sides of the combiner (reflective/transmissive). Combiners can be used in heads up displays ("HUDs"), sometimes referred to as head mounted displays ("HMDs") or near-to-eye displays, which allow a user to view a computer generated image ("CGI") superimposed over an external view. The HUD enables the user to view the CGI without having to look away from his usual viewpoint.

Generally, there are two versions of combiners. The first version combines two fields without adding any lensing to either field (such as a tilted dichroic plate). The second version includes a lensing functionality, in addition to the combining functionality, which can be an all-spherical, off-axis conic, aspheric, or freeform lensing for the field coming from the display. The lensing functionality is used to displace the virtual image originating from the display into the far field or at a specific distance from the combiner and to give the image a certain field of view to enable the user to bring the virtual image into focus at the target size. The lensing functionality is configured to provide adequate correction of the optical aberrations throughout the field of view being displayed. The lensing functionality may also be configured to provide ophthalmic correction for individual users.

A variety of optical systems and designs have been proposed for augmented reality head mounted displays. It would be desirable to provide further designs which provide relatively high field of view and eyebox dimensions for performance benefits, while enabling relatively small form factors for the optical elements employed, along with pleasing esthetics.

SUMMARY

According to aspects illustrated herein, there is provided a near eye display assembly comprising (a) frame; (b) a combiner operably connected to the frame as a first reflective surface positionable in front of an eye of a user of the display assembly; (c) a secondary mirror operably connected to the frame as a second reflective surface positionable proximate a side of the nose adjacent to the eye of a user of the display assembly; (d) an image source operably connected to the frame and optically coupled to the secondary mirror along an optical path; and (e) an optical fold element between the image source and the secondary mirror in the optical path, and positionable proximate the temple adjacent to the eye of a user of the display assembly; wherein an intermediate image is formed in the optical path between the image source and the secondary mirror, wherein the combiner and the secondary mirror are in an off-axis folded geometry which directs images from the optical fold element to an eyebox of the near eye display assembly, and at least one of the combiner and the secondary mirror include a freeform surface, wherein the freeform component corrects optical aberrations induced by a tilting and decentering of the first reflective surface and the second reflective surface, and wherein at least the combiner includes a nanostructured meta-surface which further provides wavefront control of an image from the image source to be directed to the eyebox and enables the combiner to be positioned at a tilt angle so that unobscured images are conveyable between the optical fold element and the secondary mirror while providing an FOV of at least 30 degrees and an eyebox width of at least 5 mm.

BRIEF DESCRIPTION OF THE DRAWINGS

FIGS. 1A and 1B schematically illustrate a near eye display providing high FOV and eyebox dimension, but obstruction in the optical image path.

FIGS. 2A and 2B schematically illustrate a near eye display providing high FOV and eyebox dimension, and no obstruction in the optical image path.

FIGS. 3A-3F illustrate alternative near eye display arrangements providing desired high FOV and eyebox dimensions.

FIG. 5 illustrates degradation of metasurfaces with time due to oxidation of the metal nano-tokens when no coating is used, and the remediation to degradation with a coating FIGS. 6A-6C illustrate parameters of components of an embodiment of a metasurface.

DETAILED DESCRIPTION

The purpose of the described optical systems is to be used with a human's visual system. The optical system will reside within a piece of equipment that can be worn on the user's head (e.g. glasses, helmet, visor). The optical system has an image generating component that will be viewed through the optical system, providing a magnified version of the image. This virtual image will appear to be located directly in front of the user, as viewed through an optical combiner. The user will also be able to see the real world such that the virtual image will augment the real world.

Near eye display assemblies incorporating a combiner 20 as a first reflective surface together with a secondary mirror 30 as a second reflective surface, and an image source 60 are illustrated in FIGS. 1A, 1B, 2A, 2B, 3A3F, and 4A, 4B.

Figure 4A:
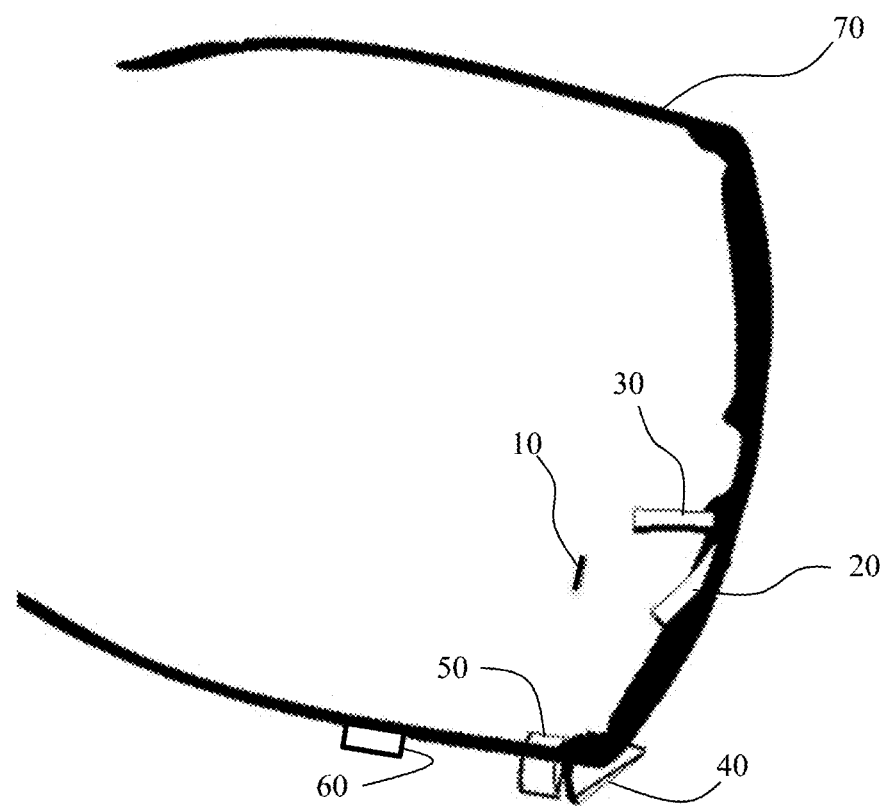
FIGS. 4A and 4B illustrate top and perspective views, respectively, of near eye display optical components attached to an eyeglasses frame.
Figure 4B:
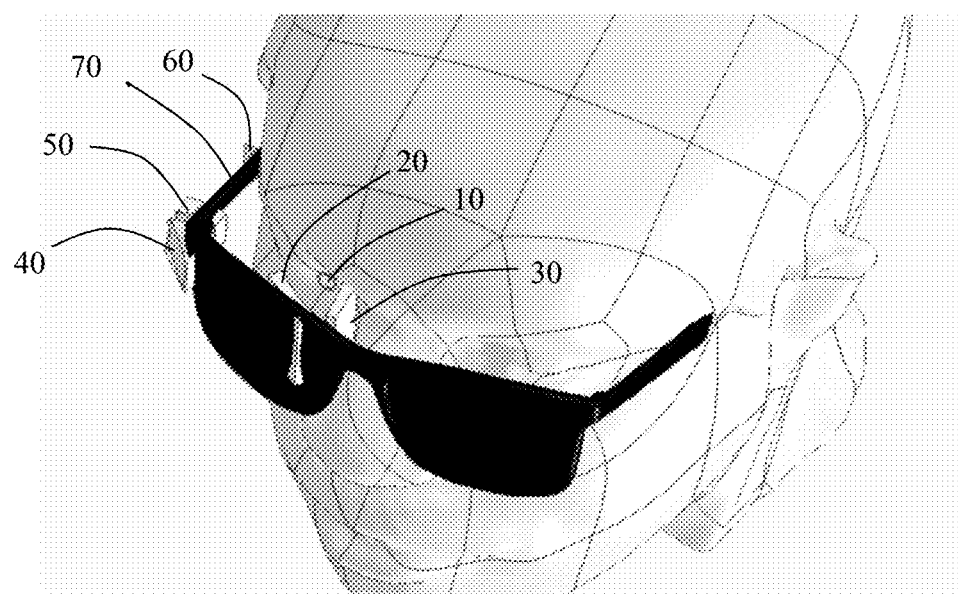

FIGS. 1A-4B illustrate a variety of geometries of the near eye display including a geometry, wherein a secondary mirror is located proximal to a side of the nose adjacent to the eye of a user of the display assembly, and more particularly a geometry wherein a freeform secondary mirror 30 may be positionable conformal to the natural shape of the nose. An image source 60 is further provided operably connected to a frame 70 as shown in FIGS. 4A, 4B, and optically coupled to the secondary mirror 30 along an optical path, and an optical fold element 40, 40a is positioned between the image source and the secondary mirror in the optical path. As shown in FIGS. 4A, 4B, the optical fold element 40 is positionable proximate the temple adjacent to the eye of a user of the display assembly.

In the described head mounted display systems, image information originates outside the field of view of the viewer, such as along the temples of eyeglass frames 70. Electronic video display data is converted into the image information by an image source or generator 60, such as an optical pattern generator, including but not limited to spatial light modulators, combined with focusing optics that angularly transform the spatial patterns or by scanning optics that directly generate angular transforms of spatial patterns. The image source encompasses any device for creating or transmitting a light pattern to the combiner. The image source includes image generators such as, but not limited to laser scanning source generators based on Light Emitting Diodes (LEDs) and Vertical Cavity Surface-Emitting Lasers (VCSELs), microdisplays, including but not limited to liquid crystal displays, either reflective or transmissive displays, and Organic Light-Emitting Diode (OLEDs), an LCoS (Liquid Crystal on Silicon) display or DLP (Digital Light Processing) device. The image source may also be combined with an anamorphic or freeform optical element or lens within the scanning optical path or located close or against the microdisplay to control optical aberrations.

In certain aspects, a separate microdisplay may be utilized for each color of light displayed, while in other aspects a single microdisplay may be utilized (e.g. by displaying a color field sequential image). Likewise, while FIGS. 4A, 4B illustrate a single image source, in some aspects, separate image sources may be utilized for the left and right eye of a viewer. This may facilitate the display of stereoscopic images. In such aspects, separate combiners may be used to produce separate left-eye and right-eye images.

Light emitted from image source 60 may be captured by a first relay lens 50. The relay lens 50 can consist of multiple elements, possibly including a doublet or a diffractive optical element for chromatic aberration management. The surface shapes of the lenses can be spherical, rotationally symmetric asphere, off-axis conic, off-axis asphere, toroidal apshere, or freeform, depending on the type and level of aberration correction needed from these lenses.

The light is then incident on an optical fold element 40, 40a, which may comprise one of the following depending on the embodiment—a fold prism 40 or 1 or more fold mirrors 40a. The fold prism 40 has a refractive surface that transmits the light exiting the first relay lens. The light within the prism interacts and reflects off the internal surface. The internal surface is at an angle so that the light is redirected. Next, the light encounters a second refractive surface of the prism through which it is transmitted. All 3 surfaces (2 refractive, 1 reflective surfaces) of the fold prism can be made spherical, rotationally symmetric aspherical, off-axis conic, off-axis asphere, toroidal asphere, or freeform for aberration correction.

If the optical fold element is instead a folding mirror 40a, then the light exiting the first relay lens 50 is incident on the fold mirror 40a, which is tilted to redirect the light roughly along an orthogonal direction. This surface can be made spherical, rotationally symmetric aspherical, or freeform for aberration correction. In this embodiment, after the fold mirror 40a, a second relay lens 35 may be employed whose main purpose is to control the physical size of the fold mirror 40a. The relay lens 35 may consist of multiple elements and have a surface shape that is spherical, rotationally symmetric asphere, off-axis conic, off-axis asphere, toroidal asphere, or freeform.

As shown in FIGS. 1A-2B, after the fold prism 40 or second relay lens 35, the light focuses to an intermediate image that is near the user's nose. Following that intermediate image, is a secondary mirror 30 that is angled to reflect the light towards a combiner 20 surface located at the typical location of glasses lens. The secondary mirror shape may be spherical, rotationally symmetric asphere, off-axis conic, off-axis asphere, toroidal asphere, or freeform for aberration correction purposes. Alternatively, as shown in FIGS. 3A-3F embodiments, an intermediate image may be formed at a reflective fold mirror surface.

Finally, the last component before the light enters the eye is the combiner 20. The shape of this surface can be spherical, toroidal, aspherical, off-axis conic, off-axis asphere, toroidal asphere, or freeform. After interacting with the combiner, the light is collimated and enters the eye at eyebox 10, which can then focus the incoming beams to form a virtual image.

Parameters that matter for a system such as this are the full field-of-view (FOV) and eyebox diameter. The full FOV determines how "big" the virtual image looks and the eyebox diameter defines the area where the user must locate his/her eye to see the virtual image without vignetting any of the FOV. From a usability standpoint, it is preferable to increase both of these parameters. However, that does not come without a cost. Increases to the FOV and eyebox diameter are directly related to increases in the overall size of the elements required in the optical system. The various optical systems described here can enable FOVs of greater than 30 degrees, including up to a 60 degree full field-of-view, in combination with eyebox diameters of 5 mm and more, including up to 8 mm eyebox diameter, as shown in FIGS. 1A-3F.

As further illustrated in FIGS. 4A, 4B, the combiner 20 can be operably connected to a frame 70, such as eyeglasses that can be worn on the head of a viewer, as a first reflective surface positionable in front of an eye of a user of the display assembly. The frame 70 may have left and right temples that rest over the ears and a nose piece that rests over the nose. The frame is shaped and sized to position each optical combiner in front of a corresponding eye of the viewer. It is understood, other frames having other shapes may be used (e.g., a visor with ear arms and a nose bridge support, a single contiguous headset member, a headband, goggle type eyewear, etc.). The term eyeglass includes corrective lenses, sunglasses, protective lenses, frames with or without lenses or with or without corrective lenses, as well as any other head mount for operably locating and maintaining the near eye display within the field of view of the viewer. Thus, the eyeglasses frame 70 can locate the secondary mirror 30 proximal to the combiner 20 or spaced apart from the combiner. The secondary mirror 30 may be located proximal to the nose of the viewer to minimize obstruction of peripheral images caused by the secondary mirror.

The combiner 20 can be operably connected to the frames in place of or in addition to eyeglass lenses, and convey the image information from outside the field of view of the viewer into the field of view of the viewer in a form that minimizes the thicknesses of the near-eye displays in front of the eyes of the viewer. The combiner occupies a limited volume of space corresponding to the space within which eyeglass lenses are normally held within the eyeglass frames. That is, the combiner may be a surface off which light bounces that can be limited in thickness (i.e., depth) to more closely resemble the dimensions of conventional eyewear.

In one aspect, the combiner 20, the secondary mirror 30, optical fold element 40, 40a and the image source 60 define a folded geometry of a connecting optical path, wherein the combiner and the secondary mirror are in an off-axis folded geometry which directs images from the optical fold element to an eyebox 10 of the near eye display assembly. At least one of the combiner and the secondary mirror may include a freeform surface, wherein the freeform component corrects optical aberrations induced by a tilting and decentering of the first reflective surface and the second reflective surface.

The near eye display can include two reflective surfaces, the combiner 20 and the secondary mirror 30 wherein the combiner and the secondary mirror are in an off axis folded geometry. In one aspect, each of the combiner 20 and the secondary mirror 30 include a freeform surface. In another aspect, both the combiner 20 and the secondary mirror 30 can include a freeform surface.

It is understood the near eye display can include additional optics, such as but not limited to a relay lens in the optical path of the source generator. The lens or additional optics may be all-spherical, aspheric, anamorphic, anamorphic aspheric, off-axis conics, off-axis aspheres, or freeform, or combination of all-spherical, aspheric, anamorphic, anamorphic aspheric or freeform.

Generally, the freeform surface is used to correct optical aberrations induced by tilting and decentering of the reflective surfaces in a folded geometry. As used herein, a non-symmetric surface with bi-axial symmetry is referred to as an anamorphic surface, while a freeform optical surface is any rotationally nonsymmetric surface whose asymmetry goes beyond bi-axial symmetry or toroidal shape. A freeform surface may be parameterized by normalized basis functions such as the phi-polynomials (e.g. Zernike sets, Q-polynomials, other sets of orthogonal polynomials, XY polynomials, Radial Basis Functions, Splines, or Non-Uniform Rational Basis Spline (NURBS).

Representative geometric tilts of the combiner surface that are required such that reflected light enters the eye for systems having the designed FOV and eyebox dimensions are shown in FIG. 1A, 1B. Even when employing freeform surfaces, as in FIGS. 1A and 1B, for the illustrated optical elements sized to provide a desired field of view and eyebox dimensions, the bottom of the combiner mirror obstructs some of the light before it hits the secondary mirror and the layout does not conform to an aesthetically desired sunglasses shape. To redirect the light that is incident upon it such that the light enters the eye without obstruction and a more aesthetic tilt that conforms with a range of glasses frames, a phase structure is patterned across the combiner surface that imparts arbitrary phase, but includes at least a linear phase for the light redirection. This is called a nanostructured surface (NSS), also referred to as a meta-surface. As shown in FIGS. 2A and 2B, when a nanostructured meta-surface in the form of a meta-grating is added to the combiner, the tilt of the combiner surface may be reduced from −34 degrees to −24 degrees, clearing the obstruction and providing a more pleasing aesthetic appearance. The nanostructured meta-surface thus enables the combiner to be positioned at a tilt angle so that unobscured images are conveyable between the optical fold element 40, 40a and the secondary mirror 30 while providing an FOV of at least 30 degrees and an eyebox width of at least 5 mm.

Further various optical systems employing an image source, an optical fold element, a secondary mirror, and a combiner similarly arranged as in FIGS. 1A-2B and which also enable relatively large FOV of from 35-60 degrees and eyebox diameters of from 5-8 mm are shown in FIGS. 3A-3F. While such illustrated systems may demonstrate some obstruction of the image by the combiner similarly as shown for the embodiments of FIGS. 1A, 1B, a nanostructured meta-surface may similarly be added to the combiner in such embodiments to enable the tilt of the combiner to be reduced and to clear the obstruction.

Design parameters for the optical surfaces of the components of the illustrated system embodiments of FIGS. 1A-3F are set forth in Tables 1.1-9.7 below, where the optical surfaces for each embodiment are numbered increasingly from the eyebox stop to the image generator. The embodiments of FIGS. 1A, 1B, 2A, 2B provide FOV/eyebox values of 54°/5 mm, while the embodiments of FIGS. 3A-3F provide FOV/eyebox of 42°/5 mm, 60°/5 mm, 37°/8 mm, 42°/5 mm, 54°/5 mm, and 37°/8 mm, respectively.

The nanostructured meta-surface provides for wavefront control. A nanostructured meta-surface is a surface or substrate in which the typical features have dimensions in the range about 30-200 nm. Nanostructured meta-surfaces useable in the present disclosure include meta-gratings such as described, e.g., in WO2016/161175 and corresponding US Patent Application Pub. No. 2018/0113310, the disclosure of which is incorporated herein in its entirety, where such meta-grating controls the wavefront across the visible spectrum. The engineered structure of the unit cells of the meta-grating and the substructures within each unit cell can create a type of freeform surface as well. That is, the freeform surface can be the meta-grating surface itself or in combination with the freeform substrate.

The meta-grating may be formed of a plurality of unit cells, wherein each unit cell includes a plurality of meta-atoms. The sizing and spacing of the meta-atoms at least partially determines the operating characteristics of the meta-grating. In one aspect, the meta-grating may be configured as an 1800 lines/mm visible spectrum meta-grating as described in WO2016/161175 and US 2018/0113310.

Referring to FIGS. 5 and 6 of WO2016/161175 and US 2018/0113310, a unit cell of an 1800 lines/mm visible spectrum meta-grating is shown. As shown therein, the unit cell can include four meta-atoms. In such FIG. 5, the meta-atoms are number 1-4, in order of decreasing phase.

In one aspect, the unit cell includes three layers—a base layer, a dielectric layer and a meta-atom layer. The dielectric layer is supported by the base layer and the meta-atom layer is supported by the dielectric layer.

The base layer is a metal layer, such as silver. The dielectric layer is formed of magnesium fluoride. As set forth in the table below, the base layer has a thickness of approximately 130 nm and the dielectric layer has a thickness of approximately 75 nm. To ensure both reflectivity and transmissivity, the meta-grating device is perforated with an aperture pattern and sizing that allows the transmission of light through the meta-grating. The perforations are sufficient to render the device substantially transparent to the viewer.

The dimensions of the meta-atoms in the unit cell of an 1800 lines/mm visible spectrum meta-grating having four meta-atoms are set forth in the table below and as labelled in FIGS. 5 and 6 of WO2016/161175 and US 2018/0113310.

| | |
|---|---|
| $L_x$ | 555.5 nm |
| $L_y$ | 221 nm |
| $T_b$ | 130 nm |
| $T_m$ | 75 nm |
| $T_t$ | 30 nm |
| $l_1$ | 84.6 nm |
| $w_1$ | 105 nm |
| $l_2$ | 47.7 nm |
| $w_2$ | 105 nm |
| $l_3$ | 177 nm |
| $w_3$ | 50 nm |
| $l_4$ | 150 nm |
| $w_4$ | 105 nm |

In one aspect, manufacturing considerations are eased by the configuration of the unit cell having each dimension of each meta-atom and the spacing between adjacent meta-atoms be greater than approximately 10 nm and less than approximately 80 nm. In some aspects, the minimum manufacturing dimension of a meta-atom dimension or spacing between adjacent meta-atoms is greater than approximately 25 nm and less than approximately 60 nm.

It is contemplated in the off-axis folded geometry of a near eye display, that either one or both the combiner and the secondary mirror include a freeform nanostructured surface having a freeform surface as well as a nanostructured surface, such as the meta-grating.

As seen in FIG. 7 of WO2016/161175 and US 2018/0113310, all four meta-atoms exhibit amplitudes greater than 80% for wavelengths longer than 575 nm. Across most of the spectral range, the phase difference between the second, third and fourth meta-atom is consistent.

In FIG. 8 of WO2016/161175 and US 2018/0113310, the most solid line represents the ideal 2 π/4, phase difference between adjacent meta-atoms using the fourth meta-atom as a baseline.

The wavelength dependent efficiency of the meta-grating generally qualitatively agrees with the predicted efficiencies of FIG. 9 of WO2016/161175 and US 2018/0113310. The efficiency increases toward the red as the individual meta-atom efficiency increases then decreases for the longer wavelengths where the phase spacing between the meta-atoms degrades. The angle dependencies are similar in shape to the TE-polarized ruled-grating efficiencies and the maximum follows for the condition α=β. This suggests that the origin is the variation in accrued propagation phase.

FIG. 10 of WO2016/161175 and US 2018/0113310 is a plot of the simulated m=+1 absolute grating efficiencies of the meta-grating and a ruled-grating versus incident angle for Transverse Electric (TE) and Transverse Magnetic (TM). Each curve illustrated in the plot represents an incident angle dependent response for a single wavelength and spans only those incident angles that result in diffraction angles less than 90°. The simulations were performed by illuminating the periodic surface with a plane wave with incident angle α and then projecting the reflected fields into the far field to determine grating efficiencies.

Overall, meta-grating TE-polarized efficiencies are higher than the ruled-grating TE polarized efficiencies for wavelengths longer than 600 nm and is competitive with the TM polarized efficiencies for wavelengths between 500 nm and 650 nm.

The meta-grating exhibits sensitivity in polarization response, as compared to a ruled grating of 1800 lines/mm. The electric field of the transverse magnetic polarization is not aligned with the meta-atoms and thus does not excite the resonances that create wavefront modulation.

Referring to FIG. 11 of WO2016/161175 and US 2018/0113310, the diffraction efficiency as a function of incidence angle with a unit cell having a length of about 555.5 nm and the meta-atoms set forth in the above table at an illumination wavelength of 650 nm. As seen in FIG. 11 of WO2016/161175 and US 2018/0113310, the dotted horizontal line represents an approximately 50% efficiency, wherein the inner shaded region corresponds to a 20° field of view and the outer shaded region corresponds to a 60° field of view. Thus, the meta-grating provides an efficiency of at least approximately 50% over a majority of the visible light spectrum. It is understood the meta-grating can be configured to provide a given predetermined efficiency, such as for example less than 50%. In this way, the meta-grating can provide an efficiency of at least approximately 20%, or 30%, or 40% or 50% over a majority of the visible light spectrum.

In one aspect, the meta-grating may be configured to provide at least approximately 50% efficiency at the desired wavelengths in reflection, and as a function of the angle of incident light on the meta-grating, within a range of operation that spans about 20° and up to 80° in alternative geometries. It is understood the mean angle of incidence varies for different geometries of the unit cell.

The freeform component is selected to correct optical aberrations induced by tilting and decentering reflective surfaces, as off-axis in a folded compact geometry. A freeform surface may be parameterized by normalized basis functions such as the phi-polynomials (e.g. Zernike sets, Q-polynomials, other sets of orthogonal polynomials, XY polynomials, Radial Basis Functions, Splines, or NURBS).

In manufacture, it is anticipated the meta-gratings of the nanostructured surface replace the required height profile control and period control that can create problems in ruled-gratings with the two dimensional binary surface control used in producing meta-gratings. As set forth above, the dimensions necessary for a meta-grating configured as an 1800 lines/mm visible surface can be greater than approximately 10 nm. While necessary dimensions greater than approximately 10 nm can assist in manufacturing, if manufacturing processes can provide for manufacture of the dimensions on the order of 1 nm, then the nanostructured surface can employ dimensions of at least approximately 1 nm.

The freeform optical surfaces can be designed with commercially available software, such as CODE V optical design software from Synopsys, Inc. of California and fabricated with commercially available equipment such as, but not limited to, a slow or fast tool servo on a Diamond Turning or Milling Machine. Freeform surfaces may also be molded out of a fabricated master.

In further embodiments, metal-dielectric nanostructured meta-surfaces which may be employed in the invention may further employ a PMMA coating to protect the meta-surface from metal oxidation and sample degradation.

Gradient metasurfaces leverage advances in nanophotonics to modulate the phase of an electromagnetic wave that can result in optical components with a compact flat form factor [1-4]. To engineer the wavefront the wave interacts with nano-tokens (or nano-atoms) that are on the scale of tens of nm [5]. To date, a variety of optical functions have been demonstrated including dual polarity lensing [6], generation of optical vortex beams [7], efficient coupling of propagating waves to surface waves [8], quarter [9] and half [10] waveplate phase retardation, and axicon lensing [11].

The issue of durability and preservation of performance over time for metal-based metasurfaces is a particularly important challenge for gap plasmon resonators [12-14] due to the risk of metal oxidation over time [15]. The oxidation can cause rapid decrease in optical performance and sample degradation. Organic polymers such as Poly(methyl methacrylate) (PMMA) have been used to preserve metallic surfaces against oxidation and contamination [16,17]. However, the introduction of a polymer layer may change/alter the plasmonic resonances which rely on the surrounding refractive index of the metallic nanostructures [18,19]. Here we study the effects of a dielectric coating used to protect metasurfaces from mechanical damage and oxidation as illustrated in FIG. 5. In particular, we are investigating the benefit of this coating on metal-insulator-metal metasurface gratings used in the visible regime [20,21]. We discuss the challenges of designing and fabricating the coated structures while preserving high efficiency in the diffraction order of interest over a broad range of angles of incidence [22,23]. Finally, we evaluate the effectiveness of the coating by comparing the change in efficiency over time for a coated and an uncoated sample.

As shown in FIG. 5, unprotected samples degrade with time due to oxidation of the metal nano-tokens causing a drop in diffractive efficiency. This loss in efficiency can be prevented via the use of a dielectric coating that protects the structures.

Simulation and Modeling

For the current work, a goal in one embodiment of the disclosure is to design a metasurface with no geometric features less than 50 nm, coated with a dielectric, that provides a linear phase response mimicking a 1200 lp/mm reflective grating. The grating is constrained to have high efficiency (~50%) in the first diffractive order at 650 nm. Furthermore, it is important that the grating efficiency does not drastically vary (flat efficiency response) as a function of the angle of incidence (AOI) $\theta_i$. This feature is particularly important if the grating is to be used in an optical system with a wide field-of-view.

The target grating period spacing of 1200 lp/mm corresponds to a periodicity Lx of 834 nm. The linear phase response is simulated stepwise by a sequence of rectangular nano-tokens within a single unit cell (one period) each of which has its own amplitude and phase response. [21]. The $-\pi$ to $\pi$ phase range is achieved based on the metal-insulator-metal geometry that consists of nano-tokens above a metallic back plane. Here, we use SiO2 for the insulator and Ag for the back plane and the nano-tokens. PMMA was used for the coating material in order to protect the sample from oxidation and contamination [18,19].

The number of tokens within the unit cell determines the number of steps in the stepwise linear phase response. For instance, for a period with three tokens there are three steps in the phase response across a single unit cell with the distances between the steps being $2\pi/3$. Splitting each unit cell in three square regions (one for each token) we get Ly=278 nm (one third of Lx=834 nm) as shown in FIG. 6A. The main degrees-of-freedom to achieve the desired stepwise linear phase response are the x and y dimensions of each token within the unit cell as well as the thicknesses of the metal and dielectric layers. A commercial-grade simulator based on the finite-difference-time-domain method [24] was used to perform the parameter sweep calculating the amplitude and phase response of tokens with varying x and y dimensions and normal AOI illumination. A set of three tokens were chosen to approximate a linear phase ramp from $-\pi$ to $\pi$ across each unit cell of the structure (see next paragraph for more details about the selection process). During the design process, we observed that we can remove the third token (which had very small dimensions) while maintaining the same efficiency response resulting in even simpler two token design (the "empty region" still serves its purpose as part of the linear phase ramp giving a relative phase response of zero). This was particularly beneficial for fabrication purposes. The final token dimensions are shown in FIG. 6A. In FIG. 6B we compare the predicted phase response of the structure (dashed curve) to the phase ramp of a perfect 1200 lp/mm blazed grating (solid line).

As shown in FIG. 6A, the unit cell for the final designed coated metasurface—top x-y and side x-z view (diagram) including dimensions in nm (table). FIG. 6B shows the modeled phase response (dashed curve) across the x-axis over four periods compared to the phase response of a perfect 1200 lp/mm blazed grating (solid line), where the squares identify the position of the tokens. FIG. 6C shows an SEM image of the fabricated sample.

It should be noted that there are various sets of three tokens that can provide a linear phase across the structure with a high efficiency for normal AOI. However, it is challenging to achieve a high efficiency for a large range of AOIs. In our workflow we first chose a set of three tokens approximating a linear phase based on the parameter sweep of a single token at normal AOI. We then modeled the complete unit cell using those three tokens for various AOIs. If the efficiency response as a function of AOI wasn't flat enough we chose another set of three tokens and reiterated the process until the final design was achieved.

Furthermore, it was observed that the addition of a thin dielectric coating results in a peak of the efficiency around the Littrow AOI (~23°) and a decreased efficiency away from that region. To explain the change in efficiency when the PMMA coating is added, we observe that the surface plasmon resonances which give rise to the enhanced 1st diffractive order efficiency, are dependent on the refractive indices of both materials at a metal-dielectric interface as shown by the following equation for the surface plasmon propagation constant [25]:

$$k_{sp}=k_0\sqrt{((\epsilon\_metal\ \epsilon\_dielectric)/(\epsilon\_metal+\epsilon\_dielectric))} \quad \#(1)$$

where $\epsilon$metal and $\epsilon$dielectric are the relative permittivity of the metal and the dielectric. Thus, changing the surrounding dielectric material from air to PMMA changes the corresponding surface plasmon resonances and therefore the corresponding grating efficiency.

We found out that the severity of the peak in efficiency around the Littrow angle can be tuned by changing the thickness of the coating. Thus, by varying the thickness of the coating and the dimensions of the tokens we achieved a design that provides a relatively high efficiency, uniform over a large range of AOIs. A coating thickness of 80 nm was chosen for the final design resulting in a relatively flat efficiency response of 45±3% over a 0-50° AOI.

Fabrication and Testing

The metasurface described above was fabricated using standard electron beam lithography (EBL) and lift-off pattern-transfer techniques. First, a 130 nm-thick Ag film was deposited on a 4-inch Si wafer using e-beam evaporation (PVD-75 Lesker, base pressure is ~1×10−6), followed by an 80 nm of SiO2 and a 30 nm of Ag film on top. Secondly, a bi-layer positive resist (495 A2 and 950 M2) was spin coated on the substrate and then exposed to the pattern designed using an EBL (JEOL9500) tool with an acceleration voltage 100 kV and area dose of 1000 µC/cm2. After EBL, the bi-layer resist [26] was developed for 45 seconds in a mixture of isopropanol (IPA):methyl isobutyl ketone (MIBK) of 3:1. The Ag tokens were formed by e-beam evaporation of 30 nm of Ag followed by a lift-off process (2 hours soak in acetone and 10 seconds sonication). For adhesion purposes, a thin layer (3 nm) of Cr was buried below each metal layer. The fabricated metasurface pattern was imaged using scanning electron microscopy (SEM) as shown in FIG. 6C. As evident by the SEM image, the fabrication quality of the resulting metasurface is in good accordance with the initial design and the rectangular shapes of nano-tokens are well formed. A thin layer of PMMA was applied by spin coating on the sample. The thickness of protection layer is controlled by the selection of the appropriate PMMA molecular weight and spin speed.

Figure 7A:
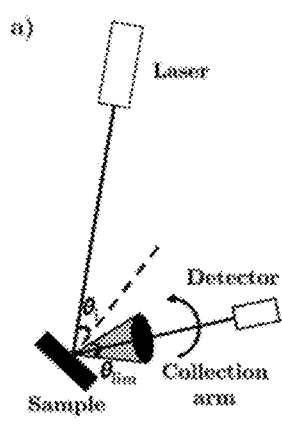
FIGS. 7A-7C illustrate the experimental setup used to measure the diffraction efficiency of a metasurface and the results obtained.

The optical setup used to measure the efficiency of the manufactured grating is presented in FIG. 7A. The sample was illuminated with a pseudo-collimated beam from a broadband laser source. The laser beam was filtered through a 10-nm bandpass filter centered at 650 nm. A linear polarizer was used to achieve the desired TE polarization. The sample was overfilled to minimize spatial intensity variations across the structure representing well the plane wave illumination used in the simulations. Due to the overfill it was required to evaluate the exact amount of power that arrives on the diffraction grating at normal AOI. We used a knife edge measurement to experimentally measure the Gaussian beam width and then derived the corresponding power based on the size of the sample. This derivation was only valid at normal AOIs, as for larger AOIs the beam footprint on the sample changes shape (becomes more elliptical), resulting in different power arriving on the grating. We used an analytic model to account for this change and to derive the accurate power input for each AOI of interest.

A custom kinematic mount for the sample was built to allow illumination at various AOIs between −90 and 90 degrees. Furthermore, the mount included a collection arm rotating concentrically around the sample's center of rotation (the arm containing the detector in FIG. 6A). This allowed measurements of the diffracted power at any angle of diffraction. For this work, the sample's efficiency was measured for AOIs from 0 to 50 degrees. Measurements in a region $\theta$lim around the Littrow angle are not possible as the input and output arm collide in that regime. AOIs larger than 50 degrees produce unreliable measurements given that a very small amount of the input illumination hits the sample causing low signal to noise ratio (as previously mentioned, the beam footprint on the sample becomes highly elliptical for larger AOIs). The efficiency of the first diffractive order was measured for each applicable AOI. For both the input and the output beams, all power measurements were done using Si photodiode and a pico-ammeter.

Results and Discussion

Figure 7B:
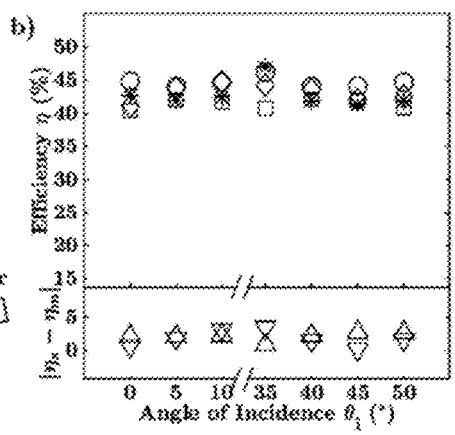

The efficiency as a function of the AOI is presented in FIG. 7B for 2 different samples based on the previously discussed design—one with the 80±2 nm PMMA coating and one with the same geometry but without any coating. Both efficiency curves are compared to the predicted modeled results and they are in good agreement. The coating thickness was confirmed using an ellipsometry measurement. The surface roughness of the PMMA layer was measured using a Zygo NewView interferometer. The achieved peak-to-valley roughness was 20 nm (<$\lambda$/30) with a RMS of only 1 nm.

Figure 7C:
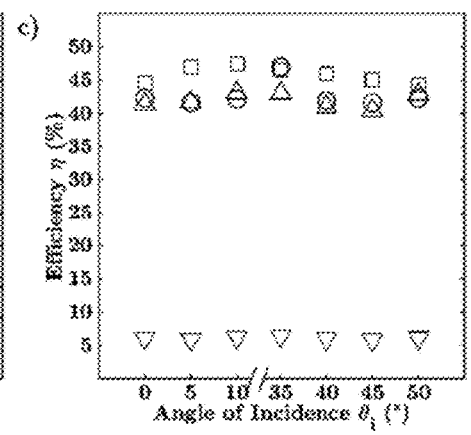

FIG. 7A illustrates the experimental setup used to measure the diffraction efficiency; $\theta$lim is the angular region where the input and output arm collide and $\theta$i is the angle of incidence measured from the normal of the surface. FIG. 7B shows a comparison between simulated $\eta$s (circle/square) and measured $\eta$m (star/rhombus) efficiency of the first diffractive order for the samples (with/without coating) at 650 nm; the bottom inset shows the absolute difference between the simulation and measurement for the samples with/without coating (upward/downward pointing triangle). FIG. 7C shows the measured efficiency at week 1 (circle/square) and week 25 (upward/downward pointing triangle) for the sample with/without coating; for all results the measurements error bars were smaller than the shown markers; the circles and upward pointing triangle symbols in FIGS. 7A and 7B corresponds to the sample with coating where the squares and downward pointing triangles is for the sample without coating. An x-axis break was used in FIGS. 7A and 7B to emphasize the regions of interest where measurements were performed (the region left out corresponds to the regime where the input and output arm collide in the experimental setup).

It was observed experimentally that the efficiency behavior at various AOIs is sensitive to the thickness of the coating film. Small deviations (~20 nm) cause the efficiency curves to vary significantly (up to 20%). This is consistent with the investigation made during the design of the metasurface grating. An important takeaway is that the coating effects on the diffraction grating efficiency are not negligible. They need to be accounted for during the design process and the thickness of the coating layer during fabrication needs to be closely monitored.

To evaluate the durability of both the coated and uncoated samples we repeated the efficiency measurement over the span of 25 weeks. During that time both samples were kept in standard room temperature and humidity. The efficiency at week 1 and week 25 are shown in FIG. 6(c). As it can be seen from the plots, the efficiency of the samples without coating drastically decreases over time dropping over 80% within 25 weeks. During that time, the sample with coating shows no significant change in the efficiency over all AOIs. These results clearly indicate that metal-dielectric metasurfaces require coating protection to prevent metal oxidation and sample degradation over time. A thin (<100 nm) PMMA film provides the demonstrated protection and sample stability.

We demonstrated the design and fabrication of a 1200 lp/mm reflective metal-dielectric metasurface grating with ~45% efficiency in the first diffractive order at 650 nm illumination. The metasurface design was optimized with an 80 nm PMMA coating to protect against metal oxidation and sample degradation. A time laps comparison was performed with one sample with and one without coating. It was shown that over 25 weeks the sample without coating lost over 80% of its efficiency in the first diffractive order, while the coated sample does not show any drop in efficiency or sample degradation. These results demonstrate that durable coated metasurfaces with custom phase response can be designed and fabricated, which lays the path for the integration of such devices in consumer optical systems. In our future studies we will further investigate the interaction of the coating with the surface plasmon resonances and the corresponding effect on the efficiency of the metasurface grating.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

Design in FIG. 1A

TABLE 1.1

| Specifications | |
|---|---|
| Parameter | Specification |
| Diagonal Full Field of View (deg) | 54 |
| Eyebox diameter (mm) | 5 |

TABLE 1.2

| Lens parameters | | | | |
|---|---|---|---|---|
| Surface | Type | Rad. of Curv. | Thickness | Material |
| Stop | Sphere | Infinity | 23.000 | |
| 2 | Fringe Zernike | — | — | Mirror |
| 3 | Fringe Zernike | 73.9695 | 48.0000 | Mirror |
| 4 | Fringe Zernike | 42.2614 | 7.0000 | PMMA |
| 5 | Fringe Zernike | 201.5677 | — | PMMA reflect |
| 6 | Fringe Zernike | 10.7261 | — | |
| 7 | Sphere | — | — | NFK5 |
| 8 | Sphere | 10.5196 | — | NSF66 |
| 9 | Asphere | 19.1887 | — | |

TABLE 1.3

| Zernike Coefficients for Surface 2 | |
|---|---|
| Normalization Radius (mm) | 14.7675 |
| Conic Constant | 2.1236 |
| Z1 | 0.0215 |
| Z2 | 0.0000 |
| Z3 | — |
| Z4 | 0.0304 |
| Z5 | — |
| Z6 | 0.0000 |
| Z7 | 0.0000 |
| Z8 | — |
| Z9 | 0.0076 |
| Z10 | 0.0000 |
| Z11 | — |
| Z12 | 0.0166 |
| Z13 | 0.0000 |
| Z14 | 0.0000 |
| Z15 | — |
| Z16 | — |
| Z17 | 0.0010 |

TABLE 1.4

| Zernike Coefficients for Surface 3 | |
|---|---|
| Normalization Radius (mm) | 13.40002 |
| Conic Constant | 0.50736 |
| Z1 | — |
| Z2 | 0.0000 |
| Z3 | — |
| Z4 | — |
| Z5 | 0.1669 |
| Z6 | 0.0000 |
| Z7 | 0.0000 |
| Z8 | — |
| Z9 | — |
| Z10 | 0.0000 |
| Z11 | 0.0280 |
| Z12 | 0.0258 |
| Z13 | 0.0000 |
| Z14 | 0.0000 |
| Z15 | — |
| Z16 | — |
| Z17 | 0.0022 |

TABLE 1.5

| Zernike Coefficients for Surface 4 | |
|---|---|
| Normalization Radius (mm) | 5.5943 |
| Conic Constant | — |
| Z1 | — |
| Z2 | 0.0000 |
| Z3 | 0.0546 |
| Z4 | — |
| Z5 | 0.0291 |
| Z6 | 0.0000 |
| Z7 | 0.0000 |
| Z8 | 0.0273 |
| Z9 | — |
| Z10 | 0.0000 |
| Z11 | — |
| Z12 | — |
| Z13 | 0.0000 |
| Z14 | 0.0000 |
| Z15 | 0.0000 |
| Z16 | — |
| Z17 | — |

TABLE 1.6

| Zernike Coefficients for Surface 5 | |
|---|---|
| Normalization Radius (mm) | 9.4000 |
| Conic Constant | 0.0000 |
| Z1 | — |
| Z2 | 0.0000 |
| Z3 | 0.0202 |
| Z4 | — |
| Z5 | 0.0739 |
| Z6 | 0.0000 |
| Z7 | 0.0000 |
| Z8 | 0.0098 |
| Z9 | — |
| Z10 | 0.0000 |
| Z11 | 0.0056 |
| Z12 | — |
| Z13 | 0.0000 |
| Z14 | 0.0000 |
| Z15 | — |
| Z16 | 0.0000 |
| Z17 | — |

TABLE 1.7

| Zernike Coefficients for Surface 6 | |
|---|---|
| Normalization Radius (mm) | 6.5664 |
| Conic Constant | — |
| Z1 | — |
| Z2 | 0.0000 |
| Z3 | — |
| Z4 | — |
| Z5 | — |

TABLE 1.7-continued

Zernike Coefficients for Surface 6

| | |
|---|---|
| Z6 | 0.0000 |
| Z7 | 0.0000 |
| Z8 | — |
| Z9 | — |
| Z10 | 0.0000 |
| Z11 | — |
| Z12 | 0.0015 |
| Z13 | 0.0000 |
| Z14 | 0.0000 |
| Z15 | — |
| Z16 | 0.0001 |
| Z17 | — |

TABLE 1.8

Aspheric coefficients for Surface 9

| | |
|---|---|
| $4^{th}$ order | 4.5042E− |
| $6^{th}$ order | −3.5242E− |
| $8^{th}$ order | 2.8858E− |
| $10^{th}$ order | −8.8505E− |

TABLE 1.9

Mirror Tilts

| Surface | Tilt (deg.) |
|---|---|
| 2 | −34 |
| 3 | −13 |
| 5 | 48 |

Design in FIG. 1B

TABLE 2.1

Specifications

| Parameter | Specification |
|---|---|
| Diagonal Full Field of View (deg) | 54 |
| Eyebox diameter (mm) | 5 |

TABLE 2.2

Lens parameters

| Surface | Type | Rad. of Curv. | Thickness | Material |
|---|---|---|---|---|
| Stop | Sphere | Infinity | 23.000 | |
| 2 | Fringe Zernike | — | — | Mirror |
| 3 | Fringe Zernike | 88.376 | 46.000 | Mirror |
| 4 | Fringe Zernike | — | 2.500 | PMMA |
| 5 | Fringe Zernike | — | 6.000 | |
| 6 | Fringe Zernike | 178.105 | — | Mirror |
| 7 | Sphere | — | — | NLAF2 |
| 8 | Sphere | 11.950 | — | NSF57 |
| 9 | Sphere | 114.292 | — | |
| 10 | Sphere | — | — | NSK14 |
| 11 | Asphere | 22.198 | — | |

TABLE 2.3

Zernike Coefficients for Surface 2

| | |
|---|---|
| Normalization Radius (mm) | 14.8940 |
| Conic Constant | 0.0000 |
| Z1 | 0.0233 |
| Z2 | 0.0000 |
| Z3 | — |
| Z4 | 0.0346 |
| Z5 | — |
| Z6 | 0.0000 |
| Z7 | 0.0000 |
| Z8 | — |
| Z9 | 0.0110 |
| Z10 | 0.0000 |
| Z11 | — |
| Z12 | 0.0206 |
| Z13 | 0.0000 |
| Z14 | 0.0000 |
| Z15 | — |
| Z16 | — |

TABLE 2.4

Zernike Coefficients for Surface 3

| | |
|---|---|
| Normalization Radius (mm) | 14.0000 |
| Conic Constant | 0.4511 |
| Z1 | — |
| Z2 | 0.0000 |
| Z3 | — |
| Z4 | — |
| Z5 | 0.2349 |
| Z6 | 0.0000 |
| Z7 | 0.0000 |
| Z8 | — |
| Z9 | — |
| Z10 | 0.0000 |
| Z11 | 0.0252 |
| Z12 | 0.0207 |
| Z13 | 0.0000 |
| Z14 | 0.0000 |
| Z15 | — |

TABLE 2.5

Zernike Coefficients for Surface 4

| | |
|---|---|
| Normalization Radius (mm) | 6.6578 |
| Conic Constant | 0.0000 |
| Z1 | — |
| Z2 | 0.0000 |
| Z3 | 0.0929 |
| Z4 | — |
| Z5 | 0.4186 |
| Z6 | 0.0000 |
| Z7 | 0.0000 |
| Z8 | 0.0464 |
| Z9 | — |
| Z10 | 0.0000 |
| Z11 | 0.0504 |
| Z12 | 0.0064 |

TABLE 2.6

Zernike Coefficients for Surface 5

| | |
|---|---|
| Normalization Radius (mm) | 6.8112 |
| Conic Constant | 0.0000 |
| Z1 | — |
| Z2 | 0.0000 |
| Z3 | 0.0081 |
| Z4 | — |
| Z5 | 0.3439 |

TABLE 2.6-continued

Zernike Coefficients for Surface 5

| | |
|---|---|
| Z6 | 0.0000 |
| Z7 | 0.0000 |
| Z8 | 0.0040 |
| Z9 | 0.0012 |
| Z10 | 0.0000 |
| Z11 | 0.0498 |
| Z12 | 0.0092 |
| Z13 | 0.0000 |
| Z14 | 0.0000 |
| Z15 | 0.0000 |
| Z16 | 0.0013 |

TABLE 2.7

Zernike Coefficients for Surface 6

| | |
|---|---|
| Normalization Radius (mm) | 8.3646 |
| Conic Constant | 0.0000 |
| Z1 | 0.0015 |
| Z2 | 0.0000 |
| Z3 | 0.0251 |
| Z4 | 0.0022 |
| Z5 | 0.0770 |
| Z6 | 0.0000 |
| Z7 | 0.0000 |
| Z8 | 0.0125 |
| Z9 | 0.0007 |
| Z10 | 0.0000 |
| Z11 | 0.0069 |
| Z12 | 0.0000 |

TABLE 2.8

Aspheric coefficients for Surface 11

| | |
|---|---|
| $4^{th}$ order | -3.7739E- |
| $6^{th}$ order | -3.3461E- |
| $8^{th}$ order | 1.6865E- |

TABLE 2.9

Mirror Tilts

| Surface | Tilt (deg.) |
|---|---|
| 2 | -34 |
| 3 | -13 |
| 6 | 47 |

Designs in FIGS. 2A, 2B

TABLE 3.1

Change from FIG. 1A, 1B

| Parameter | Specification |
|---|---|
| Grating spacing (lines/mm) | 256 |
| Tilt of M1 (deg) | -24 |

Design in FIG. 3A

TABLE 4.1

Specifications

| Parameter | Specification |
|---|---|
| Diagonal Full Field of View (deg) | 42 |
| Eyebox diameter (mm) | 5 |

TABLE 4.2

Lens parameters

| Surface | Type | Rad. of Curv. | Thickness | Material |
|---|---|---|---|---|
| Stop | Sphere | Infinity | 23.000 | |
| 2 | Fringe Zernike | — | — | Mirror |
| 3 | Fringe Zernike | 80.504 | 46.000 | Mirror |
| 4 | Sphere | 30.517 | 2.000 | 620603 |
| 5 | Sphere | — | 6.000 | |
| 6 | Fringe Zernike | 169.073 | — | Mirror |
| 7 | Sphere | — | — | 560639 |
| 8 | Sphere | 12.321 | — | 805253 |
| 9 | Sphere | 42.217 | — | |
| 10 | Sphere | — | — | 622599 |
| 11 | Sphere | 211.546 | — | |
| 12 | Sphere | — | — | 745403 |
| 13 | Sphere | — | — | |

TABLE 4.3

Zernike Coefficients for Surface 2

| | |
|---|---|
| Normalization Radius (mm) | 11.7198 |
| Conic Constant | 0.0000 |
| Z1 | 0.0000 |
| Z2 | 0.0000 |
| Z3 | — |
| Z4 | 0.0000 |
| Z5 | — |
| Z6 | 0.0000 |
| Z7 | 0.0000 |
| Z8 | — |
| Z9 | 0.0000 |
| Z10 | 0.0000 |
| Z11 | — |
| Z12 | 0.0057 |
| Z13 | 0.0000 |
| Z14 | 0.0000 |
| Z15 | — |

TABLE 4.4

Zernike Coefficients for Surface 3

| | |
|---|---|
| Normalization Radius (mm) | 10.5420 |
| Conic Constant | — |
| Z1 | 0.0000 |
| Z2 | 0.0000 |
| Z3 | — |
| Z4 | 0.0000 |
| Z5 | 0.0495 |
| Z6 | 0.0000 |
| Z7 | 0.0000 |
| Z8 | — |
| Z9 | 0.0000 |
| Z10 | 0.0000 |
| Z11 | 0.0195 |

TABLE 4.4-continued

| Zernike Coefficients for Surface 3 | |
|---|---|
| Z12 | 0.0056 |
| Z13 | 0.0000 |
| Z14 | 0.0000 |
| Z15 | — |

TABLE 4.5

| Zernike Coefficients for Surface 6 | |
|---|---|
| Normalization Radius (mm) | 10.9000 |
| Conic Constant | 0.0000 |
| Z1 | 0.0000 |
| Z2 | 0.0000 |
| Z3 | 0.0006 |
| Z4 | 0.0000 |
| Z5 | 0.1549 |
| Z6 | 0.0000 |
| Z7 | 0.0000 |
| Z8 | 0.0000 |
| Z9 | 0.0000 |
| Z10 | 0.0000 |
| Z11 | 0.0011 |
| Z12 | — |
| Z13 | 0.0000 |
| Z14 | 0.0000 |
| Z15 | — |

TABLE 4.6

| Mirror Tilts | |
|---|---|
| Surface | Tilt (deg.) |
| 2 | −34 |
| 3 | −15 |
| 6 | 50 |

Design in FIG. 3B

TABLE 5.1

| Specifications | |
|---|---|
| Parameter | Specification |
| Diagonal Full Field of View (deg) | 60 |
| Eyebox diameter (mm) | 5 |

TABLE 5.2

| Lens parameters | | | | |
|---|---|---|---|---|
| Surface | Type | Rad. of Curv. | Thickness | Material |
| Stop | Sphere | Infinity | 23.000 | |
| 2 | Fringe Zernike | — | — | Mirror |
| 3 | Fringe Zernike | 120.290 | 46.000 | Mirror |
| 4 | Sphere | 59.009 | 3.000 | 622529 |
| 5 | Sphere | — | 7.000 | |
| 6 | Fringe Zernike | 139.105 | — | Mirror |
| 7 | Sphere | — | — | 577627 |
| 8 | Sphere | 13.637 | — | 755275 |
| 9 | Sphere | 111.608 | — | |
| 10 | Sphere | — | — | 755275 |
| 11 | Sphere | — | — | 639567 |

TABLE 5.2-continued

| Lens parameters | | | | |
|---|---|---|---|---|
| Surface | Type | Rad. of Curv. | Thickness | Material |
| 12 | Sphere | — | — | |
| 13 | Sphere | — | — | 661533 |
| 14 | Asphere | — | — | |

TABLE 5.3

| Zernike Coefficients for Surface 2 | |
|---|---|
| Normalization Radius (mm) | 15.4855 |
| Conic Constant | 2.5598 |
| Z1 | 0.0000 |
| Z2 | 0.0000 |
| Z3 | — |
| Z4 | 0.0000 |
| Z5 | — |
| Z6 | 0.0000 |
| Z7 | 0.0000 |
| Z8 | — |
| Z9 | 0.0000 |
| Z10 | 0.0000 |
| Z11 | 0.0214 |
| Z12 | 0.0400 |
| Z13 | 0.0000 |
| Z14 | 0.0000 |
| Z15 | — |
| Z16 | 0.0000 |
| Z17 | 0.0058 |
| Z18 | 0.0000 |
| Z19 | 0.0000 |
| Z20 | 0.0067 |
| Z21 | 0.0071 |
| Z22 | 0.0000 |
| Z23 | 0.0000 |
| Z24 | — |

TABLE 5.4

| Zernike Coefficients for Surface 3 | |
|---|---|
| Normalization Radius (mm) | 13.2549 |
| Conic Constant | 0.0000 |
| Z1 | — |
| Z2 | 0.0000 |
| Z3 | — |
| Z4 | — |
| Z5 | 0.4402 |
| Z6 | 0.0000 |
| Z7 | 0.0000 |
| Z8 | — |
| Z9 | — |
| Z10 | 0.0000 |
| Z11 | 0.1377 |
| Z12 | 0.1379 |
| Z13 | 0.0000 |
| Z14 | 0.0000 |
| Z15 | — |
| Z16 | — |
| Z17 | 0.0108 |
| Z18 | 0.0000 |
| Z19 | 0.0000 |
| Z20 | 0.0327 |
| Z21 | 0.0319 |
| Z22 | 0.0000 |
| Z23 | 0.0000 |
| Z24 | — |
| Z25 | — |

TABLE 5.5

Zernike Coefficients for Surface 6

| | |
|---|---|
| Normalization Radius (mm) | 11.4117 |
| Conic Constant | 0.0000 |
| Z1 | 0.0081 |
| Z2 | 0.0000 |
| Z3 | — |
| Z4 | 0.0116 |
| Z5 | 0.1765 |
| Z6 | 0.0000 |
| Z7 | 0.0000 |
| Z8 | 0.0001 |
| Z9 | 0.0029 |
| Z10 | 0.0000 |
| Z11 | 0.0017 |
| Z12 | 0.0044 |
| Z13 | 0.0000 |
| Z14 | 0.0000 |
| Z15 | 0.0005 |
| Z16 | — |
| Z17 | 0.0034 |
| Z18 | 0.0000 |
| Z19 | 0.0000 |
| Z20 | 0.0003 |
| Z21 | — |
| Z22 | 0.0000 |
| Z23 | 0.0000 |
| Z24 | 0.0001 |
| Z25 | — |

TABLE 5.6

Mirror Tilts

| Surface | Tilt (deg.) |
|---|---|
| 2 | −34 |
| 3 | −16 |
| 6 | 50 |

Design in FIG. 3C

TABLE 6.1

Specifications

| Parameter | Specification |
|---|---|
| Diagonal Full Field of View (deg) | 37 |
| Eyebox diameter (mm) | 8 |

TABLE 6.2

Lens parameters

| Surface | Type | Rad. of Curv. | Thickness | Material |
|---|---|---|---|---|
| Stop | Sphere | Infinity | 23.000 | |
| 2 | Fringe Zernike | — | — | Mirror |
| 3 | Fringe Zernike | 79.386 | 46.000 | Mirror |
| 4 | Sphere | 33.090 | 3.000 | 728461 |
| 5 | Sphere | — | 3.000 | 755275 |
| 6 | Sphere | — | 8.000 | |
| 7 | Fringe Zernike | 178.005 | — | Mirror |
| 8 | Sphere | — | — | 620603 |
| 9 | Sphere | 18.951 | — | 755275 |
| 10 | Sphere | — | — | |
| 11 | Fringe Zernike | — | — | 487704 |
| 12 | Sphere | — | — | |
| 13 | Sphere | — | — | 734455 |
| 14 | Sphere | — | — | |

TABLE 6.3

Zernike Coefficients for Surface 2

| | |
|---|---|
| Normalization Radius (mm) | 12.2123 |
| Conic Constant | 0.0000 |
| Z1 | 0.0044 |
| Z2 | 0.0000 |
| Z3 | — |
| Z4 | 0.0068 |
| Z5 | — |
| Z6 | 0.0000 |
| Z7 | 0.0000 |
| Z8 | — |
| Z9 | 0.0024 |
| Z10 | 0.0000 |
| Z11 | — |
| Z12 | 0.0049 |
| Z13 | 0.0000 |
| Z14 | 0.0000 |
| Z15 | — |
| Z16 | 0.0000 |
| Z17 | 0.0027 |

TABLE 6.4

Zernike Coefficients for Surface 3

| | |
|---|---|
| Normalization Radius (mm) | 11.0000 |
| Conic Constant | — |
| Z1 | 0.0177 |
| Z2 | 0.0000 |
| Z3 | — |
| Z4 | 0.0264 |
| Z5 | 0.0092 |
| Z6 | 0.0000 |
| Z7 | 0.0000 |
| Z8 | — |
| Z9 | 0.0086 |
| Z10 | 0.0000 |
| Z11 | 0.0057 |
| Z12 | 0.0016 |
| Z13 | 0.0000 |
| Z14 | 0.0000 |
| Z15 | — |
| Z16 | — |
| Z17 | 0.0036 |

TABLE 6.5

Zernike Coefficients for Surface 7

| | |
|---|---|
| Normalization Radius (mm) | 12.4358 |
| Conic Constant | 0.0000 |
| Z1 | — |
| Z2 | 0.0000 |
| Z3 | — |
| Z4 | — |
| Z5 | 0.1697 |
| Z6 | 0.0000 |
| Z7 | 0.0000 |
| Z8 | — |
| Z9 | — |

TABLE 6.5-continued

Zernike Coefficients for Surface 7

| | |
|---|---|
| Z10 | 0.0000 |
| Z11 | — |
| Z12 | — |
| Z13 | 0.0000 |
| Z14 | 0.0000 |
| Z15 | — |
| Z16 | — |
| Z17 | — |

TABLE 6.6

Zernike Coefficients for Surface 11

| | |
|---|---|
| Normalization Radius (mm) | 7.7338 |
| Conic Constant | — |
| Z1 | 0.0000 |
| Z2 | 0.0000 |
| Z3 | 0.0471 |
| Z4 | 0.0000 |
| Z5 | — |
| Z6 | 0.0000 |
| Z7 | 0.0000 |
| Z8 | 0.0235 |

TABLE 6.7

Mirror Tilts

| Surface | Tilt (deg.) |
|---|---|
| 2 | −34 |
| 3 | −13 |
| 7 | 50 |

Design in FIG. 3D

TABLE 7.1

Specifications

| Parameter | Specification |
|---|---|
| Diagonal Full Field of View (deg) | 42 |
| Eyebox diameter (mm) | 5 |

TABLE 7.2

Lens parameters

| Surface | Type | Rad. of Curv. | Thickness | Material |
|---|---|---|---|---|
| Stop | Sphere | Infinity | 23.000 | |
| 2 | Fringe Zernike | — | — | Mirror |
| 3 | Fringe Zernike | 84.950 | 45.000 | Mirror |
| 4 | Sphere | — | 3.000 | 646734 |
| 5 | Sphere | — | 2.000 | 784256 |
| 6 | Sphere | — | 13.000 | |
| 7 | Fringe Zernike | — | — | Mirror |
| 8 | Fringe Zernike | 117.820 | 18.000 | Mirror |
| 9 | Sphere | 12.085 | 4.500 | 548472 |
| 10 | Sphere | — | 4.000 | 805253 |
| 11 | Sphere | — | 0.954 | |

TABLE 7.3

Zernike Coefficients for Surface 2

| | |
|---|---|
| Normalization Radius (mm) | 11.9326 |
| Conic Constant | — |
| Z1 | 0.0000 |
| Z2 | 0.0000 |
| Z3 | — |
| Z4 | 0.0000 |
| Z5 | — |
| Z6 | 0.0000 |
| Z7 | 0.0000 |
| Z8 | — |
| Z9 | 0.0000 |
| Z10 | 0.0000 |
| Z11 | — |
| Z12 | — |
| Z13 | 0.0000 |
| Z14 | 0.0000 |
| Z15 | — |

TABLE 7.4

Zernike Coefficients for Surface 3

| | |
|---|---|
| Normalization Radius (mm) | 11.0093 |
| Conic Constant | — |
| Z1 | 0.0000 |
| Z2 | 0.0000 |
| Z3 | — |
| Z4 | 0.0000 |
| Z5 | 0.1914 |
| Z6 | 0.0000 |
| Z7 | 0.0000 |
| Z8 | — |
| Z9 | 0.0000 |
| Z10 | 0.0000 |
| Z11 | — |

TABLE 7.5

Zernike Coefficients for Surface 7

| | |
|---|---|
| Normalization Radius (mm) | 7.2136 |
| Conic Constant | 1.6403 |
| Z1 | 0.0000 |
| Z2 | 0.0000 |
| Z3 | — |
| Z4 | 0.0000 |
| Z5 | — |
| Z6 | 0.0000 |
| Z7 | 0.0000 |
| Z8 | — |

TABLE 7.6

Zernike Coefficients for Surface 8

| | |
|---|---|
| Normalization Radius (mm) | 7.6647 |
| Conic Constant | — |
| Z1 | 0.0000 |
| Z2 | 0.0000 |
| Z3 | — |
| Z4 | 0.0000 |
| Z5 | — |
| Z6 | 0.0000 |
| Z7 | 0.0000 |
| Z8 | — |
| Z9 | 0.0000 |

TABLE 7.6-continued

Zernike Coefficients for Surface 8

| | |
|---|---|
| Z10 | 0.0000 |
| Z11 | 0.0022 |

TABLE 7.7

Mirror Tilts

| Surface | Tilt (deg.) |
|---|---|
| 2 | −34 |
| 3 | −16 |
| 7 | −26 |
| 8 | −19 |

Design in FIG. 3E

TABLE 8.1

Specifications

| Parameter | Specification |
|---|---|
| Diagonal Full Field of View (deg) | 54 |
| Eyebox diameter (mm) | 5 |

TABLE 8.2

Lens parameters

| Surface | Type | Rad. of Curv. | Thickness | Material |
|---|---|---|---|---|
| Stop | Sphere | Infinity | 23.000 | |
| 2 | Fringe Zernike | — | — | Mirror |
| 3 | Fringe Zernike | 89.140 | 45.000 | Mirror |
| 4 | Sphere | — | 3.000 | 537499 |
| 5 | Sphere | — | 2.000 | 743448 |
| 6 | Sphere | — | 14.000 | |
| 7 | Fringe Zernike | — | — | Mirror |
| 8 | Fringe Zernike | 104.364 | 20.000 | Mirror |
| 9 | Fringe Zernike | 11.583 | 2.511 | 491754 |
| 10 | Sphere | 39.215 | 0.120 | |
| 11 | Sphere | 13.799 | 4.000 | 549647 |
| 12 | Sphere | — | 3.000 | 805253 |
| 13 | Sphere | — | 0.883 | |

TABLE 8.3

Zernike Coefficients for Surface 2

| | |
|---|---|
| Normalization Radius (mm) | 14.5602 |
| Conic Constant | 2.6457 |
| Z1 | 0.0000 |
| Z2 | 0.0000 |
| Z3 | — |
| Z4 | 0.0000 |
| Z5 | — |
| Z6 | 0.0000 |
| Z7 | 0.0000 |
| Z8 | — |
| Z9 | 0.0000 |
| Z10 | 0.0000 |
| Z11 | 0.0030 |
| Z12 | 0.0036 |
| Z13 | 0.0000 |
| Z14 | 0.0000 |
| Z15 | — |
| Z16 | 0.0000 |

TABLE 8.3-continued

Zernike Coefficients for Surface 2

| | |
|---|---|
| Z17 | — |
| Z18 | 0.0000 |
| Z19 | 0.0000 |
| Z20 | 0.0008 |
| Z21 | 0.0012 |

TABLE 8.4

Zernike Coefficients for Surface 3

| | |
|---|---|
| Normalization Radius (mm) | 13.0250 |
| Conic Constant | 0.0000 |
| Z1 | — |
| Z2 | 0.0000 |
| Z3 | — |
| Z4 | — |
| Z5 | 0.3376 |
| Z6 | 0.0000 |
| Z7 | 0.0000 |
| Z8 | — |
| Z9 | — |
| Z10 | 0.0000 |
| Z11 | 0.0017 |
| Z12 | 0.0068 |
| Z13 | 0.0000 |
| Z14 | 0.0000 |
| Z15 | — |
| Z16 | — |
| Z17 | — |
| Z18 | 0.0000 |
| Z19 | 0.0000 |
| Z20 | 0.0040 |
| Z21 | — |

TABLE 8.5

Zernike Coefficients for Surface 7

| | |
|---|---|
| Normalization Radius (mm) | 8.2234 |
| Conic Constant | 3.5485 |
| Z1 | 0.0000 |
| Z2 | 0.0000 |
| Z3 | — |
| Z4 | 0.0000 |
| Z5 | — |
| Z6 | 0.0000 |
| Z7 | 0.0000 |
| Z8 | — |
| Z9 | 0.0000 |
| Z10 | 0.0000 |
| Z11 | 0.0000 |
| Z12 | 0.0004 |
| Z13 | 0.0000 |
| Z14 | 0.0000 |
| Z15 | — |
| Z16 | 0.0000 |
| Z17 | — |
| Z18 | 0.0000 |
| Z19 | 0.0000 |
| Z20 | 0.0000 |
| Z21 | 0.0000 |

TABLE 8.6

Zernike Coefficients for Surface 8

| | |
|---|---|
| Normalization Radius (mm) | 8.5587 |
| Conic Constant | 0.0000 |
| Z1 | — |
| Z2 | 0.0000 |
| Z3 | — |

TABLE 8.6-continued

Zernike Coefficients for Surface 8

| | |
|---|---|
| Z4 | — |
| Z5 | — |
| Z6 | 0.0000 |
| Z7 | 0.0000 |
| Z8 | — |
| Z9 | — |
| Z10 | 0.0000 |
| Z11 | 0.0019 |
| Z12 | 0.0003 |
| Z13 | 0.0000 |
| Z14 | 0.0000 |
| Z15 | — |
| Z16 | — |
| Z17 | 0.0003 |
| Z18 | 0.0000 |
| Z19 | 0.0000 |
| Z20 | 0.0001 |
| Z21 | 0.0000 |

TABLE 8.7

Zernike Coefficients for Surface 9

| | |
|---|---|
| Normalization Radius (mm) | 7.8828 |
| Conic Constant | 0.0000 |
| Z1 | 0.0000 |
| Z2 | 0.0000 |
| Z3 | 0.0091 |
| Z4 | 0.0000 |
| Z5 | — |
| Z6 | 0.0000 |
| Z7 | 0.0000 |
| Z8 | 0.0045 |

TABLE 8.8

Mirror Tilts

| Surface | Tilt (deg.) |
|---|---|
| 2 | −34 |
| 3 | −16 |
| 7 | −26 |
| 8 | −19 |

Design in FIG. 3F

TABLE 9.1

Specifications

| Parameter | Specification |
|---|---|
| Diagonal Full Field of View (deg) | 37 |
| Eyebox diameter (mm) | 8 |

TABLE 9.2

Lens parameters

| Surface | Type | Rad. of Curv. | Thickness | Material |
|---|---|---|---|---|
| Stop | Sphere | Infinity | 23.000 | |
| 2 | Fringe Zernike | — | — | Mirror |
| 3 | Fringe Zernike | 79.287 | 45.000 | Mirror |
| 4 | Sphere | 60.860 | 3.000 | 634576 |
| 5 | Sphere | — | 2.000 | 751315 |
| 6 | Sphere | — | 14.250 | |
| 7 | Fringe Zernike | — | — | Mirror |
| 8 | Fringe Zernike | 165.967 | 18.750 | Mirror |
| 9 | Sphere | 11.386 | 4.000 | 624601 |
| 10 | Sphere | — | 4.000 | 754279 |
| 11 | Sphere | — | 1.493 | |

TABLE 9.3

Zernike Coefficients for Surface 2

| | |
|---|---|
| Normalization Radius (mm) | 12.2870 |
| Conic Constant | 3.0503 |
| Z1 | 0.0000 |
| Z2 | 0.0000 |
| Z3 | 0.0106 |
| Z4 | 0.0000 |
| Z5 | — |
| Z6 | 0.0000 |
| Z7 | 0.0000 |
| Z8 | 0.0010 |
| Z9 | 0.0000 |
| Z10 | 0.0000 |
| Z11 | 0.0007 |
| Z12 | — |
| Z13 | 0.0000 |
| Z14 | 0.0000 |
| Z15 | — |
| Z16 | 0.0000 |
| Z17 | 0.0016 |

TABLE 9.4

Zernike Coefficients for Surface 3

| | |
|---|---|
| Normalization Radius (mm) | 11.0000 |
| Conic Constant | 7.3103 |
| Z1 | — |
| Z2 | 0.0000 |
| Z3 | — |
| Z4 | — |
| Z5 | 0.1637 |
| Z6 | 0.0000 |
| Z7 | 0.0000 |
| Z8 | — |
| Z9 | — |
| Z10 | 0.0000 |
| Z11 | — |
| Z12 | 0.0047 |
| Z13 | 0.0000 |
| Z14 | 0.0000 |
| Z15 | — |
| Z16 | — |
| Z17 | 0.0019 |

TABLE 9.5

Zernike Coefficients for Surface 7

| | |
|---|---|
| Normalization Radius (mm) | 8.3826 |
| Conic Constant | — |
| Z1 | — |
| Z2 | 0.0000 |
| Z3 | — |
| Z4 | — |
| Z5 | — |
| Z6 | 0.0000 |
| Z7 | 0.0000 |
| Z8 | — |

TABLE 9.5-continued

Zernike Coefficients for Surface 7

| | |
|---|---|
| Z9 | — |
| Z10 | 0.0000 |
| Z11 | — |
| Z12 | 0.0010 |
| Z13 | 0.0000 |
| Z14 | 0.0000 |
| Z15 | — |
| Z16 | 0.0000 |
| Z17 | 0.0001 |

TABLE 9.6

Zernike Coefficients for Surface 8

| | |
|---|---|
| Normalization Radius (mm) | 8.3931 |
| Conic Constant | 0.0000 |
| Z1 | — |
| Z2 | 0.0000 |
| Z3 | — |
| Z4 | — |
| Z5 | — |
| Z6 | 0.0000 |
| Z7 | 0.0000 |
| Z8 | — |
| Z9 | — |
| Z10 | 0.0000 |
| Z11 | 0.0021 |
| Z12 | — |
| Z13 | 0.0000 |
| Z14 | 0.0000 |
| Z15 | 0.0003 |
| Z16 | — |
| Z17 | 0.0003 |

TABLE 9.7

Mirror Tilts

| Surface | Tilt (deg.) |
|---|---|
| 2 | −34 |
| 3 | −15.22 |
| 7 | −27 |
| 8 | −20 |

REFERENCES CITED

1. N. Yu, P. Genevet, M. A. Kats, F. Aieta, J. P. Tetienne, F. Capasso, and Z. Gaburro, "Light propagation with phase discontinuities: generalized laws of reflection and refraction," Science 334, 333-337 (2011).
2. A. V. Kildishev, A. Boltasseva, and V. M. Shalaev, "Planar photonics with metasurfaces," Science 339, 1232009 (2013).
3. N. Yu and F. Capasso, "Flat optics with designer metasurfaces," Nat Mater 13, 139-150 (2014).
4. N. Meinzer, W. L. Barnes, and I. R. Hooper, "Plasmonic meta-atoms and metasurfaces," Nat. Photon 8, 889-898 (2014).
5. S. Larouche, and D. R. Smith, "Reconciliation of generalized refraction with diffraction theory," Opt. Lett. 37, 2391-2393 (2012).
6. X. Chen, L. Huang, H. Mühlenbernd, G. Li, B. Bai, Q. Tan, G. Jin, C.-W. Qiu, S. Zhang, and T. Zentgraf, "Dual-polarity plasmonic metalens for visible light," Nat. Commun. 3, 1198 (2012).
7. L. Huang, X. Chen, H. Mühlenbernd, G. Li, B. Bai, Q. Tan, G. Jin, T. Zentgraf, and S. Zhang, "Dispersionless phase discontinuities for controlling light propagation," Nano Lett. 12, 5750-5755 (2012).
8. S. Sun, Q. He, S. Xiao, Q. Xu, X. Li, and L. Zhou, "Gradient-index meta-surfaces as a bridge linking propagating waves and surface waves," Nat. Mater. 11, 426-431 (2012).
9. A. Pors and S. I. Bozhevolnyi, "Efficient and broadband quarter-wave plates by gap-plasmon resonators," Opt. Express 21, 2942-2952 (2013).
10. A. Pors, M. G. Nielsen, and S. I. Bozhevolnyi, "Broadband plasmonic half-wave plates in reflection," Opt. Lett. 38, 513-515 (2013).
11. D. Lin, P. Fan, E. Hasman, and M. L. Brongersma, "Dielectric gradient metasurface optical elements," Science 345, 298-302 (2014).
12. M. G. Nielsen, D. K. Gramotnev, A. Pors, O. Albrektsen, and S. I. Bozhevolnyi, "Continuous layer gap plasmon resonators," Opt. Express 19, 19310-19322 (2011).
13. S. Sun, K.-Y. Yang, C.-M. Wang, T.-K. Juan, W. T. Chen, C. Y. Liao, Q. He, S. Xiao, W.-T. Kung, G.-Y. Guo, L. Zhou, and D. P. Tsai, "High-efficiency broadband anomalous reflection by gradient meta-surfaces," Nano Lett. 12, 6223-6229 (2012).
14. A. Pors, and S. I. Bozhevolnyi, "Plasmonic metasurfaces for efficient phase control in reflection," Opt. Express 21, 27438-27451 (2013).
15. A. T. Fromhold, Theory of Metal Oxidation (North Holland Publishing Company, 1976).
16. T. Coan, G. S. Barroso, R. A. F. Machado, F. S. de Souza, A. Spinelli and G. Motz, "A novel organic-inorganic PMMA/polysilazane hybrid polymer for corrosion protection," Prog. Org. Coat. 89, 220-230 (2015)
17. T. Coan, G. S. Barroso, G. Motz, A. Bolzán and R. A. F. Machado, "Preparation of PMMA/hBN composite coatings for metal surface protection", Mat. Res. 16 (6), 1366-1372 (2013)
18. F. Cheng, J. Gao, Ting S. Luk & X. D. Yang, "Structural color printing based on plasmonic metasurfaces of perfect light absorption," Scientific Reports 5, 11045 (2015)
19. F. Cheng, X. D. Yang, D. Rosenmann, L. Stan, D. Czaplewski, and J. Gao, "Enhanced structural color generation in aluminum metamaterials coated with a thin polymer layer", Opt. Express 23, 25329-25339 (2015)
20. Z. Li, E. Palacios, S. Butun, and K. Aydin, "Visible-Frequency Metasurfaces for Broadband Anomalous Reflection and High-Efficiency Spectrum Splitting," Nano Lett. 15, 1615-1621 (2015).
21. A. L. Kitt, J. P. Rolland, and A. N. Vamivakas, "Visible metasurfaces and ruled diffraction gratings: a comparison, ", Opt. Mat. Express 5, 2895-2901 (2015).
22. V. S. Asadchy, A. Wickberg, A. D.-R., and M. Wegener, "Eliminating Scattering Loss in Anomalously Reflecting Optical Metasurfaces," ACS Photonics 4, 1264-1270 (2017).
23. H. F. Alvarez, M. E. de Cos Gomez, and F. Las-Heras, "Angular Stability of Metasurfaces: Challenges Regarding Reflectivity Measurements [Measurements Corner]," IEEE Antennas and Propagation Magazine 58, 74-81 (2016).
24. Inc. Lumerical Solutions.
25. H. Raether, Surface Plasmons on Smooth and Rough Surface and on Gratings, (Springer-Verlag, Berlin, 1988).
26. T. Deyu, L. Ming, S. Liwei, X. Changqing, Z. Xiaoli, "A ZEP520-LOR bilayer resist lift-off process by e-beam lithography for nanometer pattern transfer," in 7th IEEE Conference on Nanotechnology (IEEE NANO, 2007), pp 624-627.

The invention claimed is:

1. A near eye display assembly comprising:
   (a) frame;
   (b) a combiner operably connected to the frame as a first reflective surface positionable in front of an eye of a user of the display assembly;
   (c) a secondary mirror operably connected to the frame as a second reflective surface configured to be positioned proximate a side of a nose adjacent to the eye of a user of the display assembly when the first reflective surface is positioned in front of an eye of a user of the display assembly;
   (d) an image source operably connected to the frame and optically coupled to the secondary mirror along an optical path; and
   (e) an optical fold element between the image source and the secondary mirror in the optical path, and configured to be positioned proximate a temple adjacent to the eye of a user of the display assembly when the first reflective surface is positioned in front of an eye of a user of the display assembly;
   wherein an intermediate image is formed in the optical path between the image source and the secondary mirror, wherein the combiner and the secondary mirror are in an off-axis folded geometry which directs images from the optical fold element to an eyebox of the near eye display assembly, and at least one of the combiner and the secondary mirror include a freeform surface, wherein a freeform component of the freeform surface corrects optical aberrations induced by a tilting and decentering of the first reflective surface and the second reflective surface, and wherein at least the combiner includes a nanostructured meta-surface which further provides wavefront control of an image from the image source to be directed to the eyebox and enables the combiner to be positioned at a tilt angle so that unobscured images are conveyable between the optical fold element and the secondary mirror while providing an FOV of at least 30 degrees and an eyebox width of at least 5 mm.

2. The near eye display assembly of claim 1, wherein the nanostructured meta-surface comprises a meta-grating at least partially defined by a unit cell having a plurality of meta-atoms.

3. The near eye display assembly of claim 2, wherein the unit cell includes at least three meta-atoms.

4. The near eye display assembly of claim 2, wherein each of the meta-atoms in the unit cell has a different length to width ratio.

5. The near eye display assembly of claim 1, wherein the optical fold element comprises one or more fold mirrors.

6. The near eye display assembly of claim 5, further comprising a relay lens positioned between the optical fold element and the secondary mirror in the optical path.

7. The near eye display assembly of claim 5, wherein the optical fold element comprises a fold mirror having a freeform surface.

8. The near eye display assembly of claim 1, wherein the optical fold element comprises a fold prism comprising a first external refractive surface, an internal reflective surface, and a second external refractive surface.

9. The near eye display assembly of claim 8, wherein at least one of the first external refractive surface, the internal reflective surface, and the second external refractive surface of the fold prism comprises a freeform surface.

10. The near eye display assembly of claim 1, wherein the combiner includes a multitude of apertures sized and spaced to render the combiner substantially transparent to a viewer.

11. The near eye display assembly of claim 1, wherein both the combiner and the secondary mirror include a freeform surface.

12. The near eye display assembly of claim 1, further comprising an optical relay in the optical path between the image source and the optical fold element, wherein the optical relay includes at least one of a spherical, aspheric, anamorphic, anamorphic aspheric, or freeform optic or lens.

13. The near eye display assembly of claim 1, wherein the combiner includes a freeform nanostructured surface having a meta-grating at least partially defined by a unit cell having a plurality of meta-atoms.

14. The near eye display assembly of claim 1, wherein the combiner comprises a nanostructured meta-surface comprising metal nano-tokens coated with a protective dielectric layer to protect the meta-surface from metal oxidation and sample degradation.

15. The near eye display assembly of claim 14, wherein protective dielectric layer comprises poly(methyl methacrylate).

16. The near eye display assembly of claim 1, providing an FOV of at least 35 degrees.

17. The near eye display assembly of claim 1, providing an FOV of at least 40 degrees.

18. The near eye display assembly of claim 1, providing an FOV of 35-60 degrees.

19. The near eye display assembly of claim 1, providing an FOV of 40-60 degrees.

20. The near eye display assembly of claim 1, providing an eyebox width of at least 6 mm.

21. The near eye display assembly of claim 1, providing an eyebox width of at least 7 mm.

22. The near eye display assembly of claim 1, providing an eyebox width of at least 8 mm.

23. The near eye display assembly of claim 1, providing an FOV of 35-60 degrees and an eyebox width of 5-8 mm.

24. The near eye display assembly of claim 1, wherein the frame comprises left and right temples positionable over the ears and a nose piece positionable over the nose of a user.

25. The near eye display assembly of claim 24, wherein a nosepiece to temple distance is from 35-60 mm.

26. The near eye display assembly of claim 1, wherein the secondary mirror configured to be positioned proximate a side of the nose of a user and the optical fold element configured to be positioned proximate the temple of a user are separated by distance of from 35-60 mm.

* * * * *